Aug. 2, 1966　　　A. J. MARTIN　　　3,263,488
METHOD FOR GAS CHROMATOGRAPHY
Filed March 4, 1963
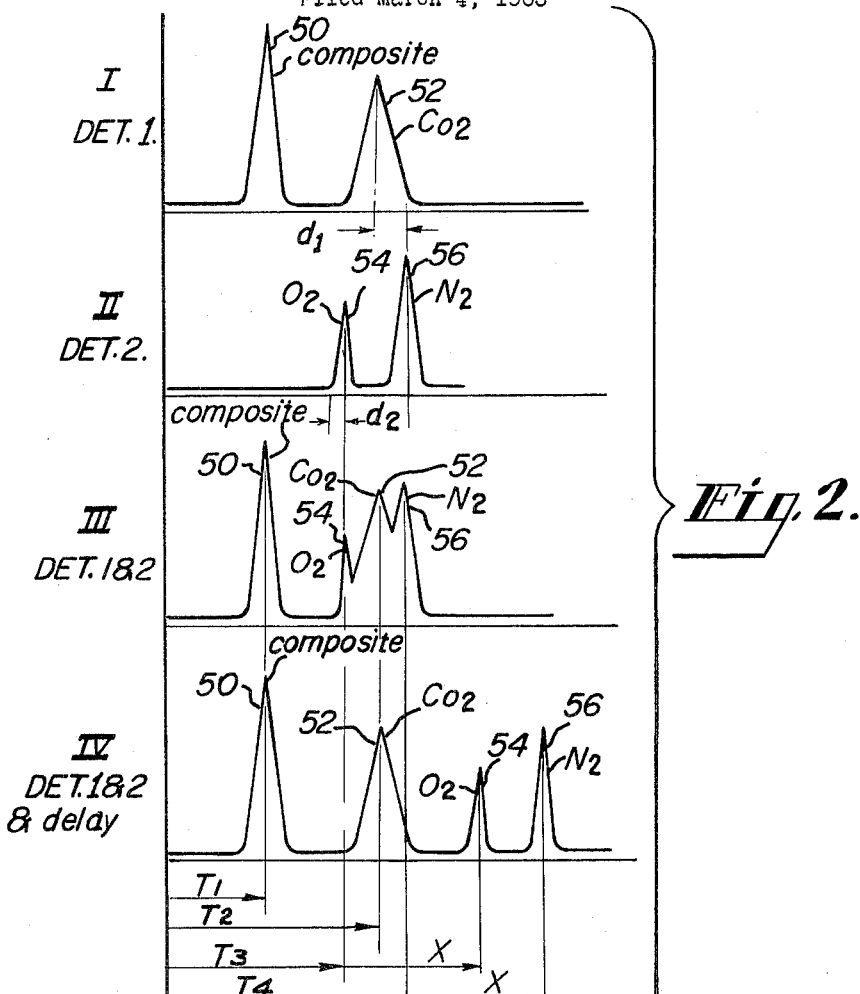
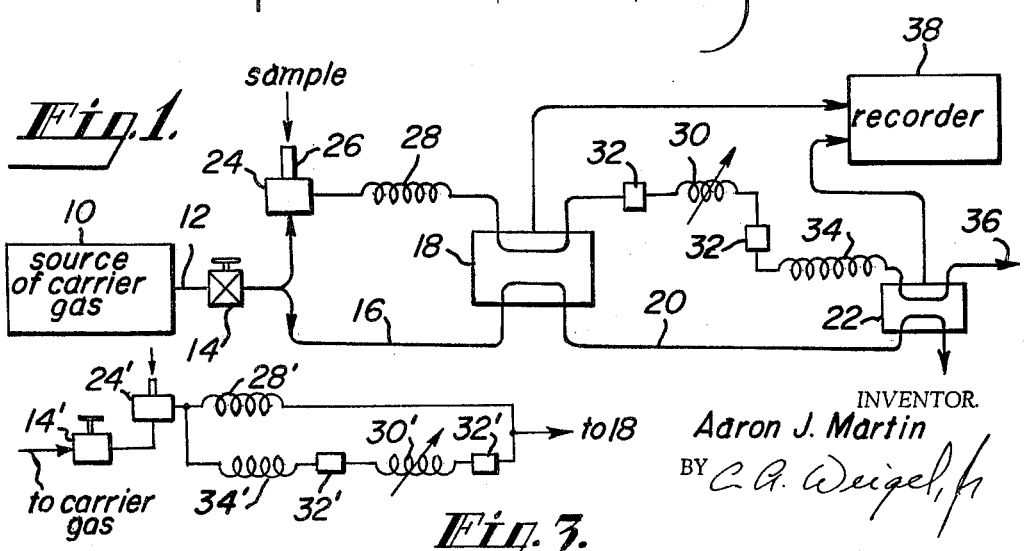
INVENTOR.
Aaron J. Martin
BY C. A. Weigel, Jr
Attorney

United States Patent Office 3,263,488
Patented August 2, 1966

3,263,488
METHOD FOR GAS CHROMATOGRAPHY
Aaron J. Martin, Kennett Square, Pa., assignor, by mesne assignments, to Hewlett-Packard Company, Palo Alto, Calif., a corporation of California
Filed Mar. 4, 1963, Ser. No. 262,513
7 Claims. (Cl. 73—23.1)

This invention relates to an improved a method for use in gas chromatography and, more particularly, to a method for providing improved separation of mixtures of constituents which are normally difficult to separate.

A typical gas chromatograph employs a tubular column either packed with finely divided materials or having an inner wall coated with a material having the necessary characteristics for adsorbing and desorbing gases, vapors, etc. A carrier gas, usually inert, is passed through such column and a sample to be analyzed is introduced into the stream of carrier gas. The sample is then swept or carried through the column. The function of the column is to selectively adsorb and desorb the several constituents of the sample at varying rates and thereby effect their separation as a function of time. As the components of the sample are individually eluted by the column material, they are individually detected by a detector, e.g. by measuring changes in thermal-conductivity of the eluted gases, or by other known techniques.

One disadvantage of the gas chromatograph is that samples containing certain constituents or samples containing many constituents often are difficult to separate by conventional chromatographic techniques. In fact, with many samples, the separation of their several different constituents by the use of either single or plural columns of given dimension and packing characteristics can be difficult if not impossible.

Often in the past these separations have been made possible merely by changing the column for one of a different diameter, different length, different packing, or by resorting to a combination of these modifications. Often a column can be found which will provide certain, but not all, of the required separations. A second column may be found which will perform the remaining separations, but not the ones which the first column will do. These two columns can be placed in a series, in parallel, or in series-parallel relationship in order to obtain the desired separation of all constituents. With such arrangements individual detectors are placed at the outputs of each column. While this technique has proven quite satisfactory in many instances, it often happens that two or more of the constituents of the sample will have the same elution times.

In these instances the detectors at the output of each column will produce overlapping or even simultaneous output signals representing those constituents having the same elution times. To analyze these individual constituents it is often necessary to use plural recording units, one for each detector. In such cases it often becomes necessary to use plural recording units and plural detectors, one of each, at the output of each column. The graph or tracing of the elution peaks produced by each of the recorders must then be compared to obtain a meaningful analysis.

As an alternative, one or the other of the two columns may be lengthened to aid in the separation. This technique has not been attractive because, with increased column length, the recorded elution peaks tends to become broader and have less amplitude. Such peaks are more difficult to analyze and do not permit measurement with the same degree of accuracy as the more narrow, sharper recorded peaks. Precise analysis tends to become more difficult and the time required to make the analysis increased.

Whenever columns are connected together in series, for example, to provide a longer effective column, it has been the practice in the prior art to place them together as closely as possible to eliminate any "dead space" in the column. Otherwise the recording time was increased. Hence every effort was made to substantially eliminate all dead space such that the plural columns would effectively be a single, continuous column. Even with these efforts the time increase required to perform the analysis has been undesirable.

As still another alternative, the prior art has shortened the columns. This alternative has the unfortunate result that while the recorded peaks may be somewhat sharper and have a greater amplitude, they tend to bunch together and overlap more, such that their separation or resolution is less satisfactory than before.

It is therefore the object of this invention to obviate many of the disadvantages of the prior gas chromatographs.

Another object of the present invention is to provide an improved method of analyzing samples by gas chromatographic techniques.

An additional object of this invention is to provide an improved method for analyzing the constituents of samples.

In accordance with a preferred embodiment of this invention, a sample having plural constituents, some of which have like or overlapping elution times, may be separated. This is accomplished by connecting plural chromatograph columns in series. Each column may have a different packing material so as to effect the complete separation of all sample constituents. A separate detector of suitable type is provided for each column. The outputs of the detectors are combined and connected to a common moving chart recorder of a known type.

In the usual case, those constituents having the same elution times from one or both columns would produce overlapping traces on the chart. In accordance with the method and apparatus of this invention, the simultaneous elution of the sample's constituents may be prevented by placing a delay zone between the detectors. This delay zone may be in its simplest form, a tube of the type conventionally employed for a chromatograph column. The tube is unpacked so as to constitute a "dead space" as compared to the corresponding property of the packed column. This dead space or volume of predetermined magnitude provides a time delay in the elution times of the several sample constituents.

In another embodiment of the invention, the columns may be placed in parallel between the point of sample introduction and a common detector. A delay zone is connected in series with either or both columns to effect the desired time separation of the elution of the sample constituents.

Further objects of this invention as well as a better understanding thereof will become apparent from the following description considered in conjunction with the drawings in which:

FIGURE 1 is a schematic electrical and flow diagram of a chromatograph constructed in accordance with this invention;

FIGURE 2 is a comparative time chart showing typical trace recordings of the different characteristics of the several different constituents of a sample using the method and apparatus of this invention;

FIGURE 3 is a schematic flow diagram of a modification of a chromatograph constructed in accordance with this invention.

Referring now to FIGURE 1 there is illustrated a gas chromatograph constructed in accordance with one form of this invention. This chromatograph is capable of separating sample constituents which are normally relatively difficult or impossible to separate using conventional techniques. A source of a carrier gas 10, such as helium, is connected through a line 12 under control of a valve 14. From the valve 14, a portion of the carrier gas is passed through a line or tube 16 to the reference side of a first detector 18 and thence on through a tube 20 to the reference side of a second detector 22, finally passing to discard or to the atmosphere.

The detectors 18 and 22 are illustrated as being of a conventional type having an analytical side and a reference side. This is merely one of the many types of detectors that may be used. The use of a reference side may be omitted if desired.

The remaining portion of the carrier gas from the control valve 14 is passed through the sample introduction portion of a gas chromatograph which, for purposes of illustration only, is shown as an injection device 24 for the first column. The injection device 24 contains an access hole 26 for vaporizing the sample if necessary and introducing it into the carrier gas stream. From the injection device 24, the carrier gas and sample in gas or vapor phase pass through the first column 28. The column length, packing material, and absorption and desorption characteristics will vary with the constituents of the sample to be analyzed. If, for example, it is desired to analyze a sample containing a mixture of oxygen ($O_2$), nitrogen ($N_2$), and carbon dioxide ($CO_2$) different column packing must be used to separate the carbon dioxide from the remaining constituents. The column 28 itself can be of any suitable material and packing. Satisfactory separation of carbon dioxide has been achieved using a column packed with silica gel 1' in length and ¼" in diameter (O.D.) and constructed of stainless steel tubing.

From the exit of the first column 28, the carrier gas stream, including the sample constituents from which the carbon dioxide is now separated, is passed through the first detector 18, and thence through a delay zone or column 30. The delay column 30 is provided with suitable couplings 32 to permit its ready removal and replacement.

For a sample mixture of oxygen, nitrogen, and carbon dioxide, the second column 34 may be packed with a molecular seive material to separate the oxygen and nitrogen. The column itself may be tubing in the order of 6' long and be ¼" in diameter (O.D.). Obviously with other sample mixtures, other column packing materials, diameters and lengths may be employed as necessary to effect the desired separation of sample constituents.

From the exit of the delay column 30 the carrier gas stream and remaining sample constituents are passed to a second column 34 and thence through the second detector 22 to an exit port 36. The outputs of each of the first and second detectors, 18 and 22, are additively combined and applied to the input of a conventional, chart type recorder 38. The function of the recorder 38 is to provide a visible trace on a moving chart roll. This trace provides visual indication of the relationship between the amplitude of the signal provided by detectors 18, 22 and time. Such trace recordings are referred to the art as chromatograms. Obviously other readout devices may be employed if desired.

The variable delay column 30, in a preferred embodiment of the invention, may be no more than a piece of tubing having an inside diameter D and a length L which may be selected according to the deductively derived formula:

$$L = \frac{4VX}{\pi D^2}$$

where V is the rate of carrier gas flow in milliliters per minute, D is the inside diameter of the delay tube 30 in centimeters, L is the length of the tube measured in centimeters required to achieve the desired delay X measured in minutes.

This invention perhaps can be more easily understood by consideration of the chromatograms, as seen in FIG. 2, in conjunction with the schematic layout of FIG. 1. Although a mixture of oxygen, nitrogen, and carbon dioxide is relatively difficult to separate using conventional techniques, the use of two columns, each having a different packing, makes such separation possible. In the example given the carbon dioxide is separated from the gas mixture by the first column 28 and the second column 34 separates the nitrogen and oxygen components. Without the use of the dual columns 28 and 34 either the carbon dioxide component or the nitrogen and oxygen of the sample would be difficult to separate. Columns of different characteristics are required to efficiently effect these separations. This is often the case where samples having many constituents are employed.

The problem arises in those cases where the elution time of the constituents separated by the first column coincides with or overlaps the elution time of the constituents separated by the second column. Consider for a moment the situation which would exist if the delay column 30 of this invention were not employed. This situation is illustrated by the idealized chromatograms I, II and III of FIG. 2. The first chromatogram I is that which would result by recording only the output of the first detector 18 on the recorder 38. This first chromatogram I therefore represents only the separation of the combined oxygen and nitrogen denoted by the first peak 50 from the carbon dioxide represented by the second peak 52. In these chromatograms, the time of sample introduction is denoted by the left-hand base line. Thus the time required for the nitrogen and oxygen to elute from the first column 28 is T1 and that for the carbon dioxide T2, where $T2 \neq T1$.

Once eluted from the first column 28, the mixture of nitrogen and oxygen pass on to the second column 34. Without use of the delay column 30, the result would be that illustrated by the second chromatogram II. This second chromatogram illustrates the operation of the second column 34 in which the oxygen is separated from the nitrogen. The oxygen, represented by the peak 54, is eluted first in time T3, then the nitrogen represented by the peak 56 is eluted in time T4 where $T4 \neq T3$. The times T3 and T4 are measured, as before, from the time the sample is initially inserted in the injection device 26. It may be noted that the times of elution T3 and T4 of the oxygen and nitrogen, respectively, overlap the time of the elution T2 of the carbon dioxide from the first column 28.

In the prior art these overlapping elution times necessiated the use of separate recorders, one for each detector 18, 22, to resolve the individual constituents of the sample. The reason for this is that if both detectors 18 and 22 are connected to the recorder 38, as permitted by the invention, the third chromatogram III of FIG. 2 would result. In the third chromatogram the mixture of nitrogen and oxygen is denoted by the peak 50 as it appears in the first chromatogram. The trace peaks 52, 54, 56 representing carbon dioxide, oxygen and nitrogen, respectively, overlap making the resolution and measurement of the individual constituents by conventional methods, relatively difficult, if not impossible.

To permit better resolution between the several elution peaks as recorded by the recorder 38 the elution peaks must be separated in time. In accordance with the invention this separation in time is achieved by delaying the elution times of the constituents separated by the second column. This delay time X must be equal to or greater than $T_2+d_1+d_2-T_3$ where $d_1$ is the time interval between the maximum of the first interfering peak 52 and its return to normal, and $d_2$ is the time interval between the beginning of the second interfering oxygen peak 54 and its maximum point. By forming a delay column 30 to provide a delay equal to or greater than X, the elution peaks of respective constituents of the sample may be separated in time as illustrated by the waveform IV in FIG. 2 where the $O_2$ and the $N_2$ elution peaks which without delay occurred at times $T_3$ and $T_4$ are both shown as being delayed by the additional time X. The separation in time occurs without broadening their bases or changing their time spacing relative to each other, other than by the delay provided by the delay column 30.

Obviously, the delay column 30 may be variable in length to facilitate the adjustment. Such variable length tube may be formed by the use of two tubes, one slidably positioned coaxially within the other. Suitable means may be used if necessary to provide a seal. For example, O-rings may be used. Alternatively, once the desired tube length is computed in accordance with the formula set forth, the tubing for column 30 may be cut to length and connected by the union 32.

It will be appreciated that the invention obviates the need for a separate recorder for each detector. This substantially reduces the cost of the gas chromatograph systems and has the advantage of permitting a single chromatogram on which appear traces of all main constituents of the sample. The principles of this invention may be extended to the use of more than two separating columns and more than two delay zones if desired. By adding columns and delay zones, more complex materials and mixtures may be readily analyzed and separated by relatively simple apparatus. The requirement of the invention is only that the delay zone be placed between those detectors having elution constituents occurring in the same time period.

Another embodiment of this invention is shown in FIG. 3. In this figure, like elements bear the same reference numerals as in FIG. 1 but have been given a prime (') designation. In the embodiment of FIG. 3 the separate columns are connected in parallel between the sample introduction device and the detector. By this connection, only a single detector 18' is required.

Thus, in FIG. 3, carrier gas from a source 10 (FIG. 1) is passed through a control valve 14' and thence is split to pass through both a sample introduction device 24' and a line 16' to the reference side of the detector 18'. From the sample introduction device 24' the conduit for the carrier gas and sample is split to pass through a first column 28' and a second column 34'. The first column 28' is connected in series with a delay zone 30' and the outputs of both columns are rejoined to pass through the measuring side of the detector 18.

In accordance with the invention, if one or more of the several constituents elute from the columns 28' and 32' in the same time interval, the delay zone 30' may be varied in its length to effect their time separation. The result therefore is substantially the same as illustrated in FIG. 1.

It is not believer necessary to discuss the embodiment of FIG. 3 further since its operation is similar to that described in FIG. 1. Obviously more than one column may be placed in parallel if desired. Also, to obtain a precise operation, it is often desirable to employ a suitable flow control device in one or more of the columns so as to maintain the rate of the flow of carrier gas therethrough substantially equal.

It should also be noted that the columns may be connected in series-parallel relationship if necessary to effect the desired separation of sample constituents. In this event the delay zone 30', as taught by this invention, may be placed in which ever branches are necessary to obtain the time separation of the eluted components from the columns.

It will be understood that reference to "packed" columns herein, and in the claims which follow, are intended to cover, broadly, internally coated adsorptive columns which may or may not be otherwise filled with packing material so long as they are effective to adsorb and desorb the desired components which are to be separated. The particular construction of the columns employed is of course well understood and forms no part of this invention.

Various other modifications in the apparatus and in the method of using it may be made as will readily occur to those skilled in the art. It is intended by the claims which follow to cover such modifications, as far as consistent with the state of the prior art.

What is claimed is:

1. The method of effecting separation by gas chromatography of a plurality of components contained in a mixture, said method comprising the steps of:
    passing a carrier gas containing said mixture at a predetermined flow rate through a first chromatograph column to effect separation of said mixture into a first component and second components, said second components normally being eluted substantially simultaneously and prior to said first component,
    continuously passing said carrier gas containing said second components eluted from said first column at said predetermined flow rate through a serially connected substantially unobstructed conduit and second chromatograph column to separate said second components, said conduit having a sufficient volume so related to said flow rate to delay in time only said second components to prevent said first component from eluting from said first column and said second components from eluting from said second column at substantially the same time, the carrier gas continuously being flowed through both said columns during the entire period of the above separations.

2. The method of claim 1 including the additional step of continuously passing the carrier gas eluting from said first column and from said second column and conduit through individual detectors.

3. The method of claim 1 including the additional step of recording the outputs of each of said detectors on a single recorder.

4. The method of effecting separation by gas chromatography of a plurality of components contained in a mixture, said method comprising the steps of:
    passing a carrier gas containing said mixture at a first predetermined flow rate through a first chromatograph column to effect separation of a first component from said mixture,
    passing said carrier gas containing said mixture at a second predetermined flow rate through a second gas chromatograph column to effect separation of a second component from said mixture, said first and second components normally being eluted from their respective columns substantially simultaneously,
    continuously passing said carrier gas containing said mixture and flowing at said second predetermined flow rate through a substantially unobstructed conduit, said conduit having a sufficient volume so related to said second flow rate to delay in time only said second component to prevent said first component from eluting from said first column and said second component from eluting from said second column and conduit at substantially the same time, the carrier gas continuously being flowed through both said columns and said conduit during the entire period of the above separations.

5. The method set forth in claim 4 including the additional step of continuously detecting the eluted components from each of said columns.

6. The method set forth in claim 4 including the additional step of rejoining in a single stream the carrier gas containing said separated first and second components after passage through the respective columns and conduit.

7. The method set forth in claim 6 including the additional step of continuously detecting the eluted components in said single stream.

References Cited by the Examiner

UNITED STATES PATENTS

| | | | |
|---|---|---|---|
| 2,413,584 | 12/1946 | Side | 137—85 X |
| 2,509,456 | 5/1950 | Saballus | 137—85 X |
| 3,056,277 | 10/1962 | Brenner. | |
| 3,097,518 | 7/1963 | Taylor et al. | 73—23.1 X |
| 3,120,749 | 2/1964 | Paglis et al. | 73—23.1 |
| 3,141,323 | 7/1964 | Taylor et al. | 55—67 X |

REUBEN FRIEDMAN, *Primary Examiner.*

C. N. HART, *Assistant Examiner.*